United States Patent Office 3,171,828
Patented Mar. 2, 1965

3,171,828
PROCESS FOR MANUFACTURING POLYMERIC POLYMETHYLENE TEREPHTHALATES
Elias Isaacs and Neil Munro, Harrogate, England, assignors to Imperial Chemical Industries Limited, London, England, a corporation of Great Britain
No Drawing. Filed Jan. 20, 1960, Ser. No. 3,477
Claims priority, application Great Britain, Nov. 23, 1955, 33,555/55; Aug. 14, 1959, 27,835/59
9 Claims. (Cl. 260—75)

This invention relates to an improved method for the manufacture of filament and film forming polyesters, more particularly to an improved catalytic system for use in the manufacture of highly polymeric polymethylene terephthalates.

This application is a continuation-in-part of our copending application Serial No. 622,833, filed November 19, 1956, for which we claim a priority of November 23, 1955, in the United Kingdom.

In the commercial manufacture of highly polymeric polymethylene terephthalates, it is common practice to use as the starting materials a dialkyl terephthalate and a glycol. These two materials are first subjected to an ester-interchange reaction in the presence of an ester-interchange catalyst and the resulting product is then polycondensed without the removal of the ester-interchange catalyst, which may assist also in the polycondensation stage or in the presence of a substance added to the reaction mixture for the purpose of catalysing the polycondensation reaction.

For the ester-interchange step many catalysts have been disclosed in the prior art. In some cases catalysts which are excellent for the ester-interchange reaction, such as catalytic compounds containing alkaline earth metals, which group of metals includes calcium, magnesium, barium and strontium, if allowed to remain in active form during the polycondensation stage, tend to either promote colour formation, particularly as regards yellowness and/or they produce insoluble precipitates in the final polyester, both of which conditions produce undesirable effects in filaments, films and the like produced from these polyesters.

It is an object of the present invention, therefore, to provide a catalyst system for the ester-interchange between a dialkyl terephthalate and a glycol of the series $HO(CH_2)_nOH$, where $n=2$–$10$ inclusive for example between dimethyl terephthalate and ethylene glycol, and for the subsequent polycondensation of the ester-interchange product. A further object is to provide a catalyst system for the manufacture of highly polymeric polymethylene terephthalate which, at the same time, prevents colour formation, particularly of yellowness, and/or the production of insoluble precipitates in the final polyesters, which in themselves, have increased brightness or sparkle over the polyesters produced by processes using prior art catalyst systems. It is also an object of the present invention to show that of the alkaline earth metal containing compounds used as ester-interchange catalysts, in the process of our invention, the catalytic compounds containing calcium or magnesium result in the formation of polyesters having the lowest degrees of colour, which factor is commonly held to be a criterion of considerable importance in the manufacture of filament and film-forming polyesters.

It has been stated above that our invention employs a polycondensation catalyst in the conversion of the ester-interchange products to polyesters and among such catalysts of the prior art, the preferred substances have been compounds of antimony and in commercial practice this has been the trivalent oxide of antimony, antimony trioxide. However, even when using an ester-interchange catalyst of a previously preferred group, those containing alkaline earth metals, for example, calcium acetate, as the ester-interchange catalyst and polycondensing the ester-interchange product in the presence of a catalyst consisting of a catalytically active calcium compound and antimony trioxide, such as is disclosed in United States specification 2,739,957, the resulting polyesters, as exemplified in this specification, are pale green in colour. In the process of our invention it is also our object to provide a polycondensation catalyst system which is superior to those disclosed in the prior art, in that in conjunction with our preferred ester-interchange catalyst it permits the production of substantially colourless filament and film-forming polyesters. These and other objects will appear more clearly hereinafter.

According to the present invention we provide in a process for the manufacture of filaments and film-forming highly polymeric polymethylene terephthalates which comprises reacting a dialkyl ester of terephthalic acid with a glycol of the series $HO(CH_2)_nOH$, wherein $n$ is greater than 1 but not exceeding 10 in the presence of a catalytic alkaline earth metal compound as the ester-interchange catalyst and subsequently polycondensing the product of this reaction in the presence of a polycondensation catalyst, the improvement which comprises converting, prior to polycondensation taking place, at least part of the alkaline earth metal compound present with the ester-interchange product into a catalytically-inert phosphorus acid salt of that metal which salt is soluble in the polycondensation reaction mixture and in the resultant polyester.

Any catalytic alkaline earth metal compound is suitable for use in the process of our invention as the ester-interchange catalyst, preferably those soluble in the ester-interchange reaction mixture such as salts of carboxylic or hydroxycarboxylic acids. Whereas we prefer catalytic calcium compounds, for these result in the formation of polyesters having the minimum of colour, particularly of yellowness, other alkaline earth metal compounds, such as of magnesium and strontium, may also be used. Preferred ester-interchange catalysts include calcium acetate, calcium benzoate, calcium salicylate, strontium acetate and magnesium carbonate.

The amount of phosphorus acid salt formed affects the degree of colour and/or of turbidity of the resultant polyester. For polyesters to be used in the manufacture of filaments, it is normally desirable that the whole of the alkaline earth metal compound present with the ester-interchange product should be converted to an alkaline earth metal salt of a phosphorus acid in order to be catalytically inert in the subsequent polycondensation reaction. However, it has been found that polyesters containing a small amount of insoluble alkaline earth metal compounds can be converted to films having improved friction characteristics. Thus by controlling the extent of formation of phosphorus acid salts in a polyester to be converted into film, the frictional properties of the film can be adjusted.

Any phosphorus compound may be added to the polyester forming reactants which permits an alkaline earth metal salt of an acid of phosphorus being present during the polycondensation reaction. Suitable phosphorus compounds to be added include phosphoric acid, phosphorous acid, alkyl phosphates, alkyl phosphites, aryl phosphates, aryl phosphites, ammonium phosphates, ammonium phosphites, glycol phosphates and glycol phosphites. Our preferred phosphorus compounds are the trivalent compounds of phosphorus, particularly phosphorous acid and triphenyl phosphite.

For use as the polycondensation catalyst in the process of our invention one can use any polycondensation catalyst of the prior art, provided always that it does not produce any detrimental effect, for example of colour, in the resulting polyester and for this reason we prefer to use catalytic compounds containing antimony or germanium.

Antimony compounds in particular, are to be preferred in that not only do they expedite a very rapid rate of polycondensation but at the same time they produce substantially no colour in the final polyester. Antimony compounds which may be used in the process of our invention include oxides of antimony, salts of antimony and inorganic acids, double salts and salts of acids of antimony. It will be appreciated that the polycondensation catalyst used must not be of a nature such that it will attack the reaction vessel. Thus it is preferred not to use salts of strong acids such as sulphuric, nitric and hydrochloric acids as any free acid liberated as a result of hydrolysis of these salts may attack the reaction vessel. This disadvantage is less noticeable if the acid produced by hydrolysis is a volatile acid, such as hydrochloric acid. Furthermore, if salts of non-volatile strong acids are used, the presence of the acid ions in the reaction mixture may affect the course of the polycondensation reaction. Because of this we prefer to use catalytic metal salts of acids having an ionisation constant not greater than $10^{-1}$ at 250° C., for example of hydrofluoric or acetic acid.

The preferred antimony compounds are those which are colourless or white, these include antimony trioxide, antimony pentoxide, antimonic acid, tri- and pentavalent antimony glycoloxides, antimony trifluoride, antimonyl potassium tartrate, antimony acetate, potassium pyroantimonate, zinc antimonate, antimony sodium fluoride. Of the compounds of germanium, the oxide has been found to be most suitable as polycondensation catalyst. The most desirable compounds of antimony are its compounds in which antimony exhibits a valency of five, for it has been found that the use of pentavalent antimony compounds results in polyesters having higher degrees of luminance and lower degrees of residual yellowness than have polyesters obtained under otherwise identical conditions using trivalent compounds of antimony as polycondensation catalyst. Of the pentavalent compounds of antimony we prefer to use antimony pentoxide or antimonic acid. As commercially obtained these pentavalent compounds often contain small amounts of trivalent antimony compounds, commonly as the trioxide, and in order to obtain the best results it is desirable for the pentavalent antimony compound to contain less than 0.2% by weight of trivalent antimony as the trioxide.

Any of the alkaline earth metal compounds referred to hereinbefore as ester-interchange catalysts may be inactivated catalytically by the addition of any of the proposed phosphorus compounds and the ester-interchange product may then be polycondensed in the presence of a suitable polycondensation catalyst. However, we have found it desirable to use a catalytic alkaline earth metal compound/trivalent phosphorus compound/a catalytic antimony compound combination as the catalyst system in the process of our invention. In particular, we prefer to use a catalytic calcium compound, preferably the acetate/triphenyl phosphite/antimony trioxide or a catalytic calcium compound/phosphorous acid/antimony trioxide combination.

The ester-interchange catalyst may be added in any amount such that it does not cause coloration in the final polyester, but in practice we have found it preferable to add the catalytic alkaline earth metal compound in an amount between 0.01–0.2% by weight based on the weight of dialkyl terephthalate used.

The phosphorus compound added to inactivate and solubilise the ester-interchange catalyst is added in an amount up to the stoichiometric equivalent of the weight of ester-interchange catalyst according to the degree of inactivation and solubilisation desired. However, if desired, in total a greater than a stoichiometric equivalent may be added, and this excess may be added at the end of the ester-interchange or during the polycondensation reaction itself.

The polycondensation catalyst again can be added in any suitable amount provided that it does not cause undesirable coloration of the final polyester. We prefer that the polycondensation catalyst be added in an amount between 0.005 and 0.1% by weight of dialkyl terephthalate used. The polycondensation catalyst may usually be added to the ester-interchange reaction mixture if desired, but we have found, particularly with antimony-containing polycondensation catalysts, that it is preferable to add the polycondensation catalyst after inactivation of the ester-interchange catalyst has taken place. This latter addition results in the obtaining of polyesters having remarkably low degrees of colour, particularly of yellowness. In the case of certain polycondensation catalysts such as antimony trifluoride, it is essential that they be added after ester-interchange as the presence of the fluoride ion in the reaction mixture inhibits the ester-interchange.

Both the ester-interchange and polycondensation reactions may take place at atmospheric or under sub- or super-atmospheric pressure conditions, in either the liquid or solid phase. We prefer that the ester-interchange takes place under atmospheric pressure conditions at a temperature between 150 and 235° C. and that polycondensation takes place under reduced pressure conditions at a pressure less than 1 mm. of mercury in the temperature range of 210–300° C., desirably below 285° C., preferably in the liquid i.e. melt phase.

During the ester-interchange methanol is continuously withdrawn from the reactor and when methanol ceases to be evolved, the ester-interchange is substantially complete. Reduced pressure is essential during the polycondensation stage for the removal of the glycol liberated, to enable the formation of a high molecular weight polyalkylene terephthalate from which filaments and films can be drawn.

The present invention is particularly exemplified hereinafter with respect to the preparation of polyethylene terephthalate from dimethyl terephthalate and ethylene glycol; however, it should be understood that the process is fully applicable to the manufacture of filament and film-forming polyesters in which the starting materials may be any low molecular alkyl ester of terephthalic acid or mixture of such esters or these esters may be partially replaced, e.g. up to 40% by weight with one or more esters of other dicarboxylic acids such as of isophthalic, phthalic, adipic, sebacic, glutaric and naphthalic acids. Alternatively glycols other than ethylene glycol, of the series $HO(CH_2)_nOH$ where $n=2-10$ inclusive, may be used or mixtures of any of these glycols or with other glycols such as hexhydro-paraxylylene glycol may also be used as starting materials.

The process of our invention, while exemplified as a batch process, may readily be operated as a continuous process in either or both of the ester-interchange and polycondensation stages. The catalysts of our invention may be added to the reaction mixture when operating continuously either individually, collectively or in the form of a solution or a dispersion, for example in an alcohol and for this we have found the use of the glycol used in the reaction to be a particularly suitable solvent for dispersing agent for the catalysts.

For the purpose of comparing the colours of polyesters made by the process of our present invention with those made by prior art methods, solution optical densities of the polyesters may be compared. Solution optical density is the optical density of a solution of 10 gm. polyester in 100 ml. dichloracetic acid, measured at a wavelength of 400 mμ in a 4 cm. cell.

Relatively small variations in the solution optical densities of polyesters prepared for filament and film end uses can be of considerable importance in deciding the value of such polyesters for commercial purposes and it is thus desirable, particularly for filament end uses, that such a polyester should have as low a solution optical density as is possible.

It has been suggested in United States specification 2,534,028 to use litharge both as an ester-interchange catalyst and as a polycondensation catalyst in the manufacture of filament and film-forming polyethylene terephthalate, but as described in United States specification 2,650,213, when litharge is used in concentrations which are sufficiently high for satisfactory commercial operation, the colour of the resulting polyester is not acceptable for conversion to film or filaments. This latter specification claims a litharge/triphenyl phosphite/antimony trioxide catalyst system in the manufacture of polyethylene terephthalate.

It is stated in United States specification 2,650,213 that it is important that the triphenyl phosphite be added at the beginning of the polycondensation which, as stated in the specification, means that it can be added at any time before the intrinsic viscosity of the polyester reaches 0.1–0.2. From a practical standpoint, it is stated that the catalyst system consisting of the combination of three components is conveniently added at the beginning of the ester-interchange reaction. In the two examples in the specification, illustrating the invention, the triphenyl phosphite was in both cases added with the ester-interchange reactants and the resulting polyesters were noticeably yellow in colour as they were defined therein as being of Standard II, i.e. "very light amber."

However, if in the process of our invention, the phosphorus compound is added at the beginning of the ester-interchange reaction, the presence of the phosphorus compound inhibits, partially or completely according to the quantity of the phosphorus compound present, the alkaline earth metal compound from acting catalytically during the ester-interchange reaction.

It could not be predicted by one skilled in the art that the polyesters of our invention would be substantially colourless or "water-white" as defined by Standard I of United States specification 2,650,213. Furthermore it could not be predicted that it was necessary in the process of our invention to add the phosphorus compound after the completion of the ester-interchange reaction, contrary to the stage of addition exemplified in United States specification 2,650,213.

The following examples in which all parts are by weight illustrate but do not limit the scope of our invention.

| Example | Ester-Interchange Catalyst | Phosphorus Compound | Polycondensation Catalyst | Intrinsic Viscosity |
|---|---|---|---|---|
| 1 | Calcium acetate (0.116). | Triphenyl phosphite (0.23). | Antimony trioxide (0.023). | 0.65 |
| 2 | ...do... | Phosphorous acid (0.06). | ...do... | 0.68 |
| 3 | ...do... | ...do... | ...do... | 0.72 |
| 4 | Calcium benzoate (0.232). | Phosphorus acid (0.066). | ...do... | 0.65 |
| 5 | Calcium borate (0.116). | Phosphorous acid (0.075). | ...do... | 0.64 |
| 6 | Calcium salicylate (0.232). | Phosphorous acid (0.061). | ...do... | 0.62 |
| 7 | Strontium acetate (0.116). | Phosphorous acid (0.046). | ...do... | 0.62 |
| 8 | Calcium acetate (0.116). | Phosphoric acid (0.072). | ...do... | 0.68 |
| 9 | ...do... | Hypophosphorous acid (0.048). | ...do... | 0.63 |
| 10 | ...do... | Phosphorous acid (0.06). | Germanium dioxide (0.046). | 0.65 |
| 11 | ...do... | Phosphorous acid (0.03). | Antimony trioxide (0.023). | 0.64 |
| A | ...do... | Nil | ...do... | 0.65 |

In each example in the above table 116 parts of dimethyl terephthalate (in Example 3, 104 parts of dimethyl terephthalate with 12 parts of dimethyl isophthalate) is reacted with 92 parts of ethylene glycol at the boil in the presence of the alkaline earth metal compound. When the ester-interchange is complete, in approximately 2½ hours, the phosphorus compound, then the polycondensation catalysts are added and after the removal of excess glycol the product is subjected to polycondensation over 4 hours at 278° C. with pressure reducing to 0.3 mm. mercury. The polyester formed is quenched by pouring the melt into cold water and its intrinsic viscosity determined using a 1% solution in o-chlorphenol at 25° C.

In Examples 1–10 the resulting polyester or copolyester is clear, bright and free from precipitated calcium compounds. In Example 11 the polyethylene terephthalate is slightly turbid due to the presence of some deposited calcium salt.

The comparative Example A results in a polyester which is very cloudy in appearance.

The intrinsic viscosity of the polyesters obtained enables them to be readily used for filament and film-forming purposes.

The following Examples 12–15 inclusive illustrate preferred embodiments of our invention using our preferred ester-interchange catalysts, calcium acetate or magnesium carbonate, inactivating the alkaline earth metal with phosphorous acid or triphenyl phosphite and adding an antimony compound, the trioxide as the polycondensation catalyst. These examples are shewn in comparison with Examples B and C, using a litharge, triphenyl phosphite, antimony trioxide catalyst system, as claimed in United States specification 2,650,213. In Example B the ingredients are added in the manner described in Example 1 of United States specification 2,650,213, while in Example C the triphenyl phosphite is added after ester-interchange has been completed. In all of these Examples 12–15 inclusive, B and C are undertaken under similar conditions, i.e. they are undertaken in similar equipment and equal quantities of dimethyl terephthalate are used. The ester-interchange reaction in each case takes place over 1¼ hours in the range 160–190° C. and this product is polycondensed for 2 hours at 282° C. When Example 12 is repeated except that the phosphorus compound is added with the ester-interchange reactants, substantially no ester-interchange reaction takes place, as indicated by the lack of methanol liberated.

| Ex. No. | Catalysts (Percent by weight) | | Solution Optical Density |
|---|---|---|---|
| | Added before Ester-interchange | Added after Ester-interchange | |
| 12 | Calcium acetate, 0.07 | Phosphorus acid, 0.036. Antimony trioxide, 0.04. | 0.149 |
| 13 | ...do... | Triphenyl phosphite, 0.14. Antimony ttrioxide, 0.04. | 0.106 |
| 14 | Magnesium carbonate, 0.033. | Phosphorous acid, 0.023. Antimony rioxide, 0.04. | 0.069 |
| 15 | ...do... | Triphenyl phosphite, 0.11. Antimony trioxide, 0.04. | 0.059 |
| B | Litharge, 0.02. Antimony trioxide, 0.05. Triphenyl phosphite, 0.10. | | 0.265 |
| C | Litharge, 0.02. | Triphenyl phosphite, 0.10. Antimony trioxide, 0.05. | 0.431 |

*Example D*

152 parts of di-(β-hydroxyethyl) terephthalate is heated to 278° C. in the presence of 0.116 part calcium acetate and 0.06 part phosphorous acid, while a slow stream of deoxidised nitrogen is being passed through the mixture. No thickening of the melt occurs indicating that polycondensation is not taking place.

The same result is obtained (1) when 0.23 part triphenyl phosphite are substituted for the phosphorous acid and (2) when 0.22 part calcium phosphite ($2CaHPO_3 \cdot 3H_2O$) along are tested for catalytic activity.

*Example E*

1 part calcium acetate and 0.52 part phosphorous acid are dissolved in ethylene glycol and reacted at the boil for 15 minutes. After cooling, the precipitated solid is filtered off and water washed before identification by qualitative tests as a calcium salt of phosphorous acid.

*Example F*

1 part calcium acetate and 2 parts triphenyl phosphite are heated slowly together in 100 parts ethylene glycol. The mixture becomes homogeneous at 175° C. and is subsequently boiled gently for 15 minutes. On cooling, the separated solid is washed glycol free with water and air dried. Quantitative tests indicate the product to be a calcium phosphite (analysis: Found, P = 23.0%; $2CaHPO_3 \cdot 3H_2O$ requires P = 21.1%).

Examples E and F show that an alkaline earth compound, in this case, calcium acetate, will react with phosphorous acid or one of its esters in glycol solution to yield calcium phosphite. In Example D it is demonstrated that in this form the alkaline earth metal will not promote the polycondensation of glycol terephthalate esters. This inert character of the alkaline earth salts of phosphorus containing acids is of added value since absence of polycondensation catalysts is, of course, paralleled by a similar absence of polymer degradative activity. The alkaline earth metal, having served its essential purpose of promoting ester-interchange may, by this technique, be converted into a form in no respect harmful to final polymer properties.

In the commercial use of highly polymeric polymethylene terephthalates for filament end uses it is a common practice to incorporate with the polyester forming materials a delustrant, such as titanium dioxide. When such a delustrant is incorporated in the polyester it is possible to obtain measurements of the reflectance of the polyester in the form of a ribbon on a "Colormaster," which is the trade name for the differential colorimeter manufactured by the Manufacturers Engineering and Equipment Corporation; from these measurements it is possible to compare the yellowness and luminance values of polyesters prepared using various catalyst systems.

Luminance (Y on the C.I.E. system) is a measure of the proportion of the incident light reflected and yellowness, is a measure, based on C.I.E. chromaticity coordinates, of the separation of the point representing the colour rating of the polymer from the point representing standard illuminant "C," positive values being measured in the direction of a dominant wave-length of 580–590 mμ and negative values in the direction of a dominant wavelength of 470–490 mμ.

We have found that when the yellowness value is not substantially less than zero and when using a tri- or pentavalent antimony compound as the polycondensation catalysts, a useful criterion of colour is obtained by subtracting the yellowness value from that of the luminance. The best colour is obtained when the luminance value minus the yellowness value is at a maximum. However, for a comparison of this type to be made it is essential that the polyesters in the examples to be compared are manufactured under identical conditions for example on the same scale and in the same equipment. It must be also noted that no direct comparison using this criterion can be made if an additional ester-interchange catalyst is present in the ester-interchange reaction mixture as this catalyst in itself may upset the luminance/yellowness balance.

The following Example 16 illustrates the high degree of luminance together with a low degree of yellowness that is obtained when polyethylene terephthalate delustred with titanium dioxide is prepared using the process of the present invention. The advantages obtained using the catalyst system of our invention is compared with the use of other prior art ester-interchange catalysts and with the system claimed in United States specification 2,650,213.

*Example 16*

(*a*) Dimethyl terephthalate (100 parts), ethylene glycol (68 parts) and magnesium carbonate (0.035 parts) are heated together in an agitated glass vessel. Evolution of methanol commences at a temperature of 175° C. and is continued for 1 hour 45 minutes until the theoretical yield of methanol (40 parts) has been evolved. The temperature is then 225° C. Glycol (20 parts) is then distilled off, and the residue is transferred to a second glass vessel, also agitated. Triphenyl phosphite (0.13 part) is added, followed after an interval of 5 minutes by fine slurries of antimonic acid (0.05 part) and titanium dioxide (0.5 part) in glycol. The pressure is reduced and the temperature raised until a pressure of 0.2 mm. of mercury and a temperature of 285° C. is obtained and held under these conditions for 2 hours 20 minutes, when the polymer is extruded and cast as a ribbon on water-cooled rollers. The polyethylene terephthalate has a luminance of 68 and a yellowness value of 1.

(*b*) Example 16(*a*) is repeated but using calcium acetate (0.06 part) as ester-interchange catalyst instead of magnesium carbonate. Polyethylene terephthalate of luminance 71 and yellowness 3 is obtained.

By comparison is Example 16 is repeated but using 0.02 part of manganese acetate as ester-interchange catalyst a polymer of luminance 63 and yellowness −1 is obtained. With 0.02 part of cobalt acetate as ester-interchange catalyst the polymer is of luminance 58 and yellowness −17 and with 0.015 part of zinc acetate the polymer is of luminance 68 and yellowness 6.

Also for purposes of comparison Example 1 of Untied States specification is repeated in the same equipment as for Example 16 above, by using litharge (0.02 part), antimony trioxide (0.05 part) and triphenyl phosphite (0.1 part) as described in the example, except that 0.5 part of titanium dioxide, as delustrant are also added. Ester-interchange takes 4 hr. 46 min. and polycondensation to an intrinsic viscosity of 0.675 takes 4 hr. 12 min. In Example 16(*a*) the ester-interchange takes 3 hr. 39 mins. and polycondensation takes only 2 hr. 44 min. to the same intrinsic viscosity of 0.675. The polymer obtained using the litharge/triphenyl phosphite/antimony trioxide system has a luminance of 68 and a yellowness of 7.

Thus it can be seen that the polymers obtained in all of the comparative examples have luminance minus yellowness values less than those of either of the polymers obtained by the processes of Examples 16(*a*) and 16(*b*).

We claim:

1. In a process for the manufacture of filament and film-forming highly polymeric polymethylene terephthalates by reacting a dialkyl ester of terephthalic acid with a glycol of the series $HO(CH_2)_nOH$ wherein *n* is greater than 1 but not exceeding 10 in the presence of a catalyst consisting essentially of a catalytic alkaline earth metal compound present in amounts ranging from about 0.01 to about 0.20 percent based on the weight of dialkyl terephthalate to produce an ester interchange product and subsequently polycondensing said ester interchange product, the improvement of converting, prior to said polycondensing step, at least a portion of said alkaline earth metal compound present in said ester interchange product into a catalytically inert salt of said alkaline earth metal and a phosphorus acid which salt is soluble in both the polycondensation reaction mixture and the resultant polyester product and polycondensing said ester interchange product in the presence of said catalytically inert salt of said alkaline earth metal and a polycondensation catalyst.

2. The process of claim 1 wherein said salt of the alkaline earth metal is produced by the reaction of said alkaline earth metal compound with a phosphorus-containing compound selected from the group consisting of phosphorus acid, phosphoric acid, alkyl phosphites, aryl phosphites, ammonium phosphites and glycol phosphites.

3. The process of claim 2 wherein said phosphorous-containing compound is triphenyl phosphite.

4. In a process for the manufacture of filament-forming highly polymeric polymethylene terephthalates having improved color properties by reacting a dialkyl ester of terephthalic acid with a glycol of the series $$HO(CH_2)_nOH$$

wherein $n$ is greater than 1 but not exceeding 10 in the presence of a catalyst consisting essentially of a catalytic alkaline earth metal compound present in amounts ranging from about 0.01 to about 0.20 percent based on the weight of dialkyl terephthalate to produce an ester interchange product and subsequently polycondensing said ester interchange product, the improvement of converting, prior to said polycondensing step, the whole amount of said alkaline earth metal compound present in said ester interchange product into a catalytically inert salt of said alkaline earth metal and a phosphorus acid which salt is soluble in both the polycondensation reaction mixture and the resultant polyester product, and polycondensing said ester interchange product in the presence of said catalytically inert salt of said alkaline earth metal and a polycondensation catalyst.

5. In a process for the manufacture of film-forming highly polymeric polymethylene terephthalates having improved friction characteristics by reacting a dialkyl ester of terephthalic acid with a glycol of the series $$HO(CH_2)_nOH$$

wherein $n$ is greater than 1 but not exceeding 10 in the presence of a catalyst consisting essentially of a catalytic alkaline earth metal compound present in amounts ranging from about 0.01 to about 0.20 percent based on the weight of dialkyl terephthalate to produce an ester interchange product and subsequently polycondensing said ester interchange product, the improvement of converting, prior to said polycondensing step, said alkaline earth metal compound present in said ester interchange product into a catalytically inert salt of said alkaline earth metal and a phosphorus acid which salt is soluble in both the polycondensation reaction mixture and the resultant polyester product, in controlled amounts so that the quantity of said phosphorus acid salt will be maintained below the stoichiometric equivalent of the weight of said alkaline earth metal compound, and polycondensing said ester interchange product in the presence of said catalytically inert salt of said alkaline earth metal and a polycondensation catalyst.

6. In a process for the manufacture of filament or film-forming highly polymeric polyethylene terephthalate by reacting dimethyl terephthalate with ethylene glycol in the presence of a catalyst consisting essentially of calcium acetate in amounts ranging from about 0.01 to about 0.20 percent based on the weight of said dimethyl terephthalate to produce an ester interchange product and subsequently polycondensing said ester interchange product, the improvement of converting, prior to the polycondensing step, at least a portion of said calcium acetate present in said ester interchange product into calcium phosphite and polycondensing said ester interchange product in the presence of calcium phosphite and antimonic acid as the polycondensation catalyst.

7. The process of claim 6 wherein the entire amount of the calcium acetate present in the ester interchange catalyst is converted into calcium phosphite.

8. The process of claim 6 wherein the polycondensation catalyst is antimony trioxide.

9. The process of claim 7 wherein the polycondensation catalyst is antimony trioxide.

References Cited in the file of this patent

UNITED STATES PATENTS

| | | |
|---|---|---|
| 2,650,213 | Hofrichter | Aug. 25, 1953 |
| 2,739,957 | Billica et al. | Mar. 27, 1956 |
| 2,921,051 | Amborski et al. | Jan. 12, 1960 |
| 3,028,366 | Engle et al. | Apr. 3, 1962 |

FOREIGN PATENTS

| | | |
|---|---|---|
| 588,833 | Great Britain | June 4, 1947 |